United States Patent
Orischak

(10) Patent No.: US 10,158,217 B1
(45) Date of Patent: Dec. 18, 2018

(54) INTERLOCKING WIRE CONDUITS FOR VEHICLES

(71) Applicant: Ford Global Technologies, LLC, Dearborn, MI (US)

(72) Inventor: John Orischak, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/672,989

(22) Filed: Aug. 9, 2017

(51) Int. Cl.
*H02G 3/00* (2006.01)
*H02G 3/04* (2006.01)
*H02G 3/22* (2006.01)

(52) U.S. Cl.
CPC ........... *H02G 3/263* (2013.01); *H02G 3/0406* (2013.01); *H02G 3/0462* (2013.01); *H02G 3/22* (2013.01)

(58) Field of Classification Search
CPC ....... H02G 3/0406; H02G 3/0462; H02G 3/22
USPC ....................................... 174/70 C
See application file for complete search history.

(56) References Cited

U.S. PATENT DOCUMENTS 7,939,761 B2   5/2011  Baverel et al.
9,831,646 B2 * 11/2017  Tsukamoto .......... H02G 3/0468

FOREIGN PATENT DOCUMENTS

| CN | 2917042 Y    |   | 6/2007 |
|----|--------------|---|--------|
| DE | 10359377 B3  |   | 2/2005 |
| JP | 2000115942 A |   | 4/2000 |
| JP | 3685387      | * | 8/2005 |
| JP | 2008005608 A |   | 1/2008 |
| JP | 2014045628 A |   | 3/2014 |

* cited by examiner

*Primary Examiner* — Timothy Thompson
*Assistant Examiner* — Charles Pizzuto
(74) *Attorney, Agent, or Firm* — James P. Muraff; Neal, Gerber & Eisenberg LLP

(57) ABSTRACT

Method and apparatus are disclosed for interlocking wire conduits for vehicles. An example vehicle includes wiring and conduits. The conduits include a first conduit and a second conduit that each include an inner surface defining a pathway for the wiring, an outer surface, annular ribs extending from the outer surface and defining annular grooves, flanges protruding from distal ends of the annular ribs and configured to interlock with the flanges of the other of the conduits.

7 Claims, 7 Drawing Sheets

INTERLOCKING WIRE CONDUITS FOR VEHICLES

TECHNICAL FIELD

The present disclosure generally relates to conduits and, more specifically, to interlocking wire conduits for vehicles.

BACKGROUND

Typically, vehicles includes a number of electronic devices. Generally, electrical wires and/or cables are coupled to the electronic devices to transmit electrical and/or communicative signals between the electronic devices. Oftentimes, a large number of electrical wires and/or cables are required to electrically and/or communicatively couple a set of electronic devices. In some instances, cable or wire harnesses are utilized to bundle a plurality of electrical wires and/or cables for organizational and/or space-saving purposes. Some cable or wire harnesses incorporate straps, cable ties, cable lacing, sleeves, electrical tape, etc. to bundle the plurality of electrical wires and/or cables together.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for interlocking wire conduits for vehicles. An example disclosed vehicle includes wiring and conduits. The conduits include a first conduit and a second conduit that each include an inner surface defining a pathway for the wiring, an outer surface, annular ribs extending from the outer surface and defining annular grooves, flanges protruding from distal ends of the annular ribs and configured to interlock with the flanges of the other of the conduits.

An example disclosed wire conduit includes an inner surface defining a pathway, an outer surface, and annular ribs extending from the outer surface and defining annular grooves. The annular ribs are configured to be received by grooves of a corrugated structure. The annular grooves are configured to receive ribs of the corrugated structure. The example disclosed conduit also includes flanges protruding from distal ends of the annular ribs and configured to interlock with opposing flanges of the corrugated structure for coupling to the corrugated structure.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
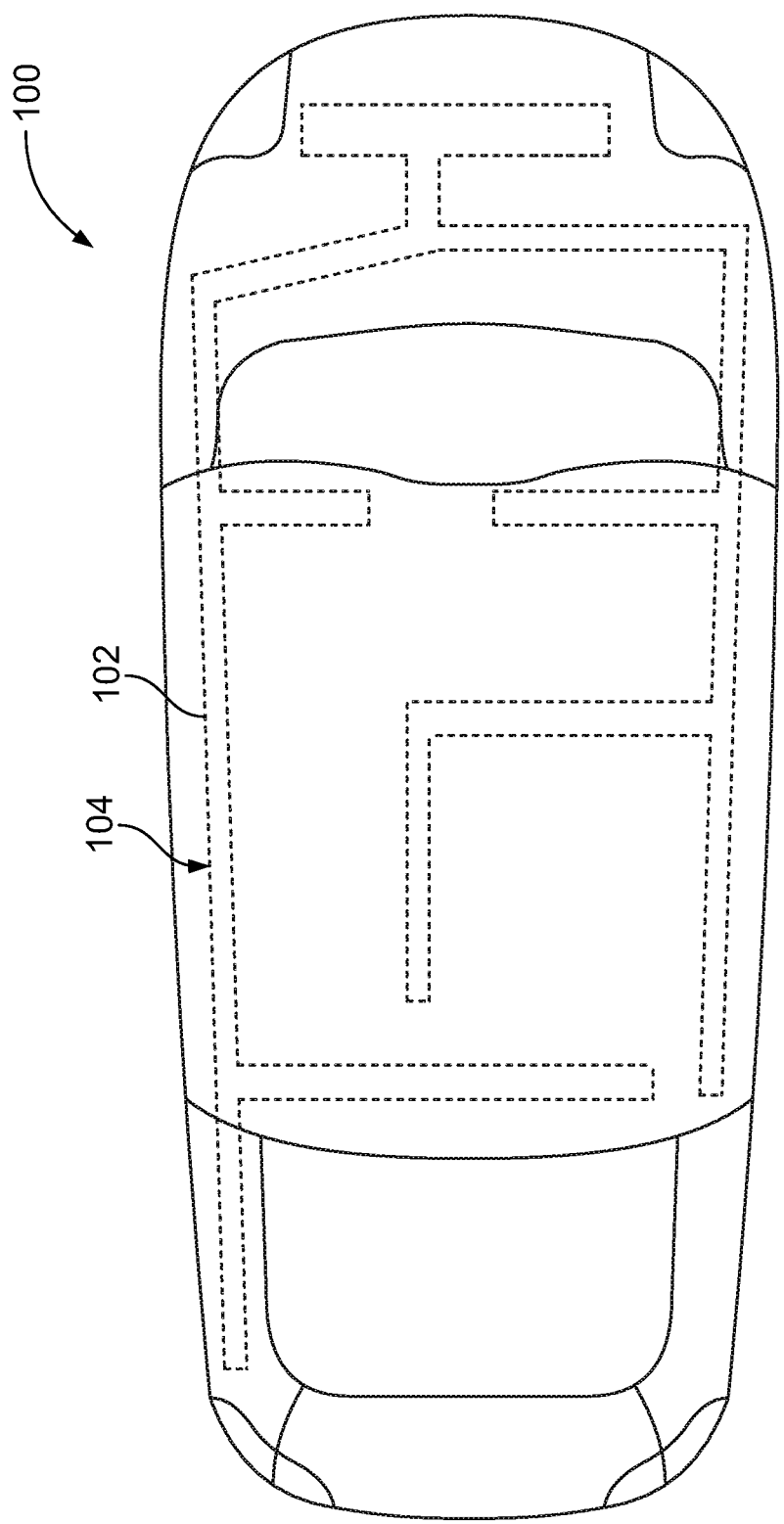
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles includes a number of electronic devices. Generally, electrical wires and/or cables are coupled to the electronic devices to transmit electrical and/or communicative signals between the electronic devices. Oftentimes, a large number of electrical wires and/or cables are required to electrically and/or communicatively couple a set of electronic devices. In some instances, cable or wire harnesses are utilized to bundle a plurality of electrical wires and/or cables for organizational and/or space-saving purposes. Some cable or wire harnesses incorporate straps, cable ties, cable lacing, sleeves, electrical tape, etc. to bundle the plurality of electrical wires and/or cables together. In some instances, the cable or wire harnesses hang downward and/or rest on a floor surface between the corresponding electronic devices in an undesired manner.

Example apparatus disclosed herein include a wire conduit having outer ribs and interlocking flanges protruding from the outer ribs that enable the wire conduit to interlock with another conduit and/or corrugated structure (e.g., a corrugated wall) to enable the wire conduit to be quickly and easily positioned at a desired location. For example, the wire conduit is configured to interlock with another conduit and/or corrugated structure within a vehicle to enable the wire conduit and, thus, wires and/or cables positioned within the conduit to be quickly and easily positioned at a desired location for organizational and/or space-saving purposes.

Examples disclosed herein include interlocking corrugated conduits. The interlocking corrugated conduits include, for example, wire conduit(s), retainer(s), shield(s), other electrical harness(es), other corrugated structure(s), and/or any combination thereof. The corrugated conduits include ribs that are configured to mesh with ribs of other corrugated conduit. The ribs include flanges that are shaped to engage and interlock with flanged ribs other corrugated conduit. For example, when a first corrugated conduit and a second corrugated conduit are interlocked together, a rib of the first corrugated conduit is received by a groove of the second corrugated conduit, a groove of the first corrugated conduit receives a rib of the second corrugated conduit, and a flange of the rib of the first corrugated conduit engages and interlocks with a flange of the rib of the second corrugated conduit.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes one or more conduits 102 and wiring 104 that run throughout the vehicle 100. For example, the conduits 102 include two conduits that at least partially extend along each other in a side-by-side manner through the vehicle 100. The wiring 104 of the illustrated example electrically and/or communicatively couples various electrical components of the vehicle. The conduits 102 house the wiring 104 (e.g., in bundles) to form a wire harness that facilitates the wiring 104 in extending through the vehicle 100 in an organized manner. For example, the wire harnesses formed from the conduits 102 and the wiring 104 may extend through a floor, a roof, a cabin, one or more doors, one or more seats, under a hood, within a trunk, and/or any other location within the vehicle 100 to connect the electrical components of the vehicle 100.

Figure 2:
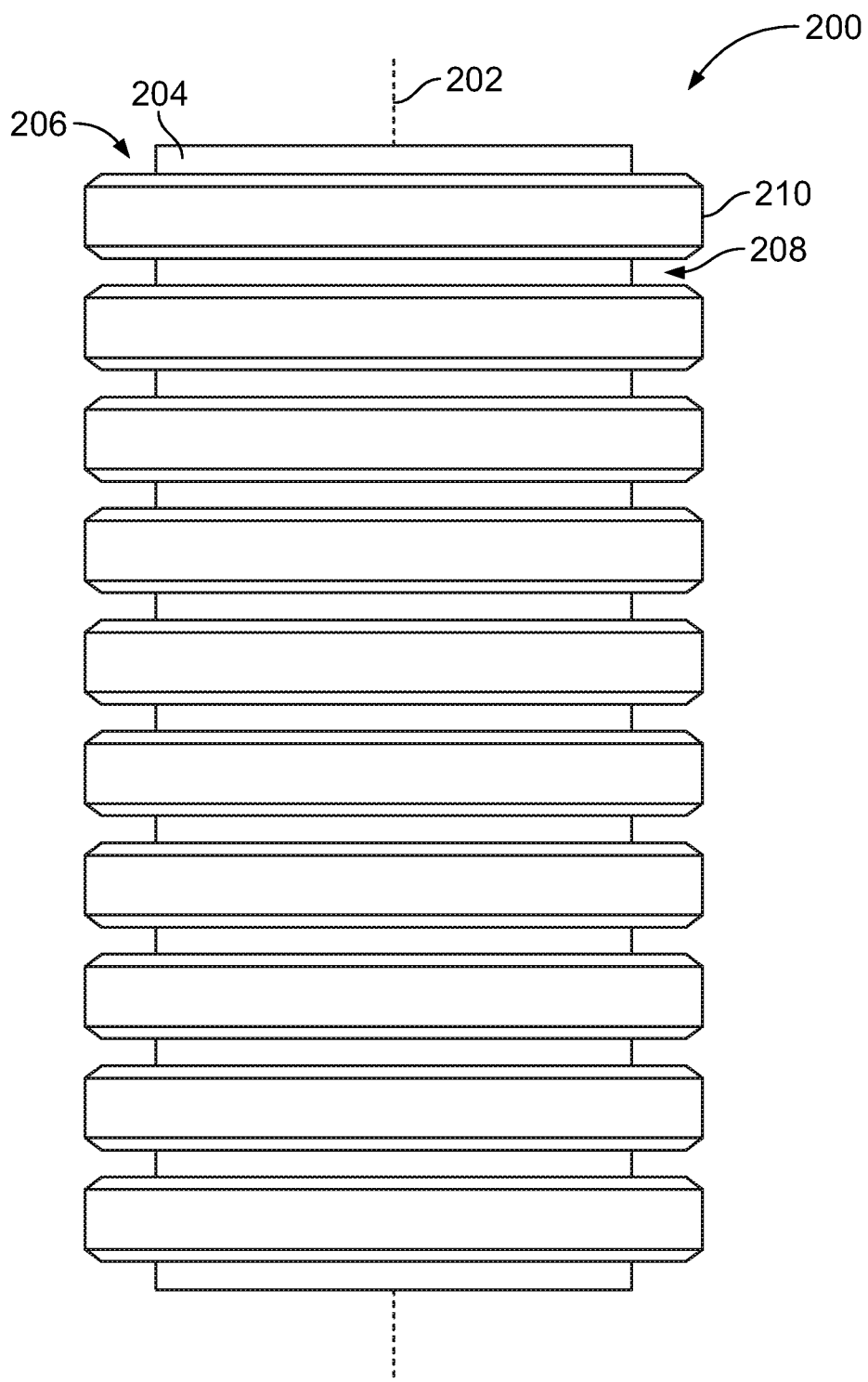
FIG. 2 depicts a side view of an example corrugated conduit in accordance with the teachings herein.

FIG. 2 illustrates a side view of an example conduit 200 in accordance with the teachings herein. In the illustrated example, the conduit 200 extends along a center line 202. For example, when the conduit 200 extends in a straight line, the center line 202 is an axis of the conduit 200. When the conduit 200 is curved, the center line 202 is an arc along which the conduit 200 extends. Further, in the illustrated example, the conduit 200 is in the shape of a tube. For example, the conduit 200 is a convoluted tube and/or a non-convoluted tube. When the conduit 200 is a convoluted tube, the conduit 200 is formed from a sheet that coils about the center line 202 (e.g., an axis) to define the tube. In other examples, the conduit 200 may be any other non-tubular shape (e.g., rectangular, triangular, ovular, etc.) that enables the conduit 200 to house wiring (e.g., the wiring 104 of FIG. 1).

As illustrated in FIG. 2, the conduit 200 includes an outer surface 204 and ribs 206 that extend from the outer surface 204. In the illustrated example, the ribs 206 are annular ribs that extend annularly along the outer surface 204 on a plane perpendicular to the center line 202 of the conduit 200. For example, one or more of the ribs 206 extend around a circumference of the outer surface 204. In other examples, the ribs 206 are spiral ribs that extend in a spiraled manner along the outer surface 204 relative to the center line 202 of the conduit 200.

The ribs 206 of the illustrated example define grooves 208. That is, the ribs 206 are spaced apart from each other such that each of the grooves 208 is defined between a corresponding pair of the ribs 206. In the illustrated example, the grooves 208 are annular grooves that extend annularly about the outer surface 204 on a plane perpendicular to the center line 202 of the conduit 200. In other examples, the grooves 208 are spiral grooves that extend in a spiraled manner about the outer surface 204 relative to the center line 202 of the conduit 200.

Further, the conduit 200 of the illustrated example also includes flanges 210 that protrude from distal ends of the ribs 206. That is, each of the ribs 206 include a first end that couple to the outer surface 204 of the conduit 200 and a second end (e.g., a distal end) from which one of the flanges 210 protrude. In the illustrated example, one or more of the ribs 206 extend around the circumference of the outer surface 204.

The flanges 210 of the conduit 200 are configured to enable the conduit 200 to couple to and interlock with another conduit (e.g., a conduit 400 of FIG. 4) and/or corrugated structure. For example, the ribs 206 are configured to be received by grooves (e.g., annular grooves, spiral grooves) of the other conduit and/or corrugated structure, the grooves 208 are configured to receive ribs (e.g., annular ribs, spiral ribs) of the other conduit and/or corrugated structure, and the flanges 210 are configured to extend into the grooves and beyond flanges of the other conduit and/or corrugated structure. In the illustrated example, the flanges 210 are formed of flexible material (e.g., a flexible plastic) to enable the flanges 210 to bend, bow, and/or otherwise flex to facilitate the flanges 210 in being inserted into the grooves and beyond the flanges of the other conduit and/or corrugated structure. That is, the flanges 210 are formed of flexible material to enable the flanges 210 of the conduit 200 to interlock with the flanges of the other conduit and/or corrugated structure. Further, in some examples, the outer surface 204, the ribs 206, and the flanges 210 are integrally formed together such that the outer surface 204 and the ribs 206 are formed of the flexible material.

Figure 3:
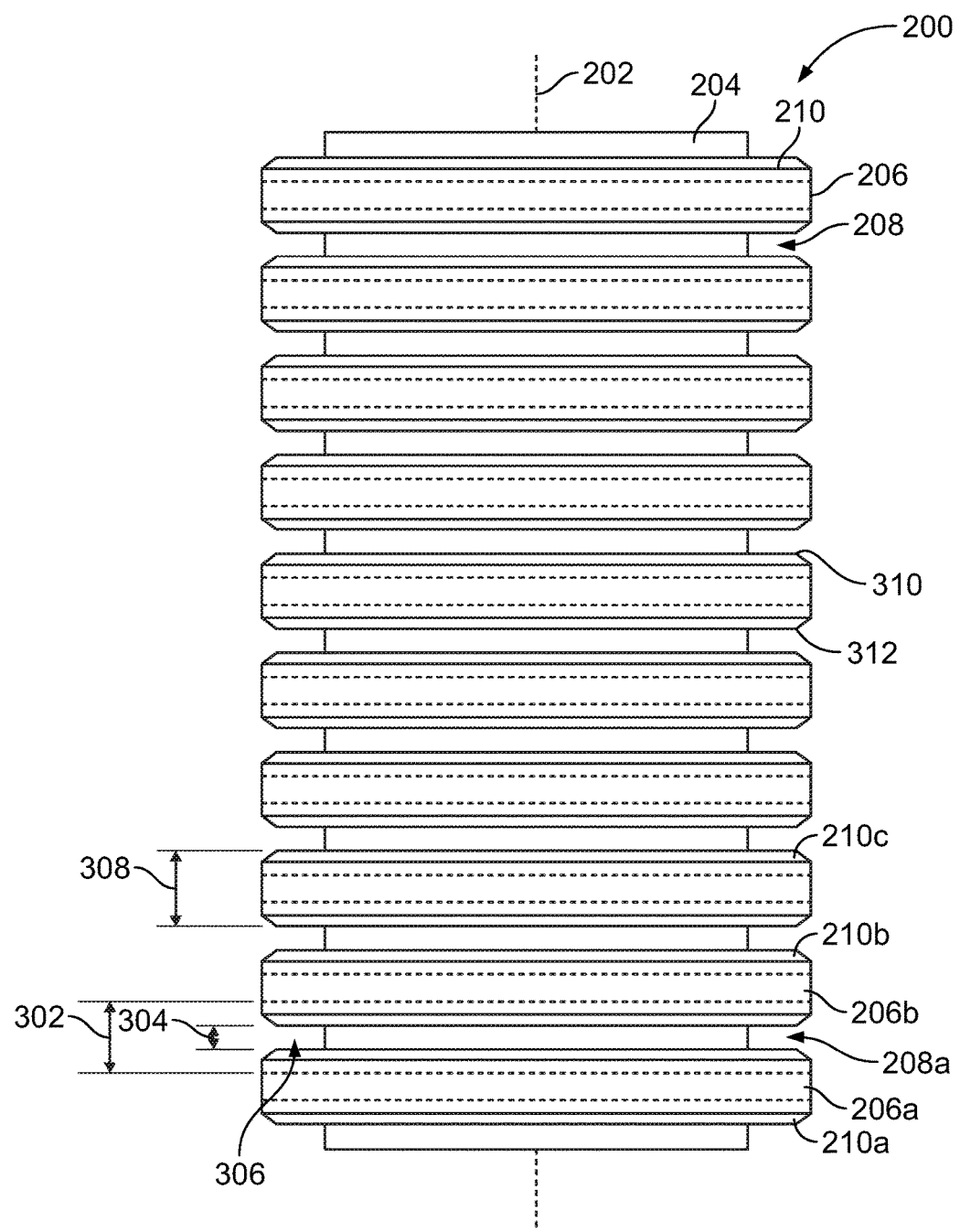
FIG. 3 depicts another side view of the corrugated conduit of FIG. 2.

FIG. 3 also illustrates another side view of the conduit 200 in which the ribs 206 that extend from the outer surface 204 to the flanges 210 are depicted via hidden lines. In the illustrated example, the ribs 206 of the conduit 200 include a 206a (e.g., a first rib, a first annular rib) and a rib 206b (e.g., a second rib, a second annular rib) that are located next to each other along the outer surface 204 of the conduit 200. The rib 206a and the rib 206b are spaced apart from each other to define a width 302 (e.g., a first width) of a groove 208a (e.g., a first groove, a first annular groove) of the grooves 208. In the illustrated example, the other of the grooves 208 also have the width 302. Further, the flanges 210 of the conduit 200 include a flange 210a (e.g., a first flange) that protrudes from the rib 206a and a flange 210b (e.g., a second flange) that protrudes from the rib 206b. The flange 210a and the flange 210b are spaced apart from each other to define by a width 304 (e.g., a second distance) of an opening 306 (e.g., an annular opening) of the groove 208a. In the illustrated example, the other of the grooves 208 also have the opening 306 having the width 304. Additionally, the flanges 210 of the conduit 200 include a flange 210c (e.g., a third flange) that has a thickness 308. In the illustrated example, the other of the flanges 210 also have the thickness 308.

As illustrated in FIG. 3, the thickness 308 is greater than the width 304 of the opening 306 between the flanges 210 and less than the width 302 of the grooves 208 between the ribs 206. For example, the width 304 of the opening 306 is less than a thickness (e.g., the thickness 308) of a flange of another conduit (e.g., the conduit 400 of FIG. 4) and/or corrugated structure to enable the flange 210a and the flange 210c of the conduit 200 to interlock with the flange of the other conduit and/or corrugated structure when the flange of the other conduit and/or corrugated structure is retained within the groove 208a of the conduit 200. Further, the thickness 308 of the flange 210c of the conduit 200 is less than a first width (e.g., the width 302) between ribs of the other conduit and/or corrugated structure and greater than a second width (e.g., the width 304) between flanges of the other conduit and/or corrugated structure to enable the flange 210c to interlock with the flanges of the other conduit and/or corrugated structure when retained within a corresponding groove of the other conduit and/or corrugated structure.

Further, as illustrated in FIG. 3, one or more of the flanges 210 each include a lip 310 (e.g., a first lip) and a lip 312 (e.g., a second lip) opposite the lip 310. In the illustrated example, the lip 310 of each of the flanges 210 extends in a first direction that is perpendicular to a direction in which the ribs 206 extend. Additionally, the lip 312 of each of the flanges 210 extends in a second direction that is opposite to the first direction and perpendicular to the direction in which the ribs 206 extend. The lip 310 and the lip 312 of the flanges 210 are to engage corresponding flanges of other conduit and/or corrugated structure when inserted into grooves of the other conduit and/or corrugated structure to cause the conduit 200 to interlock with the other conduit and/or corrugated structure.

Figure 4:
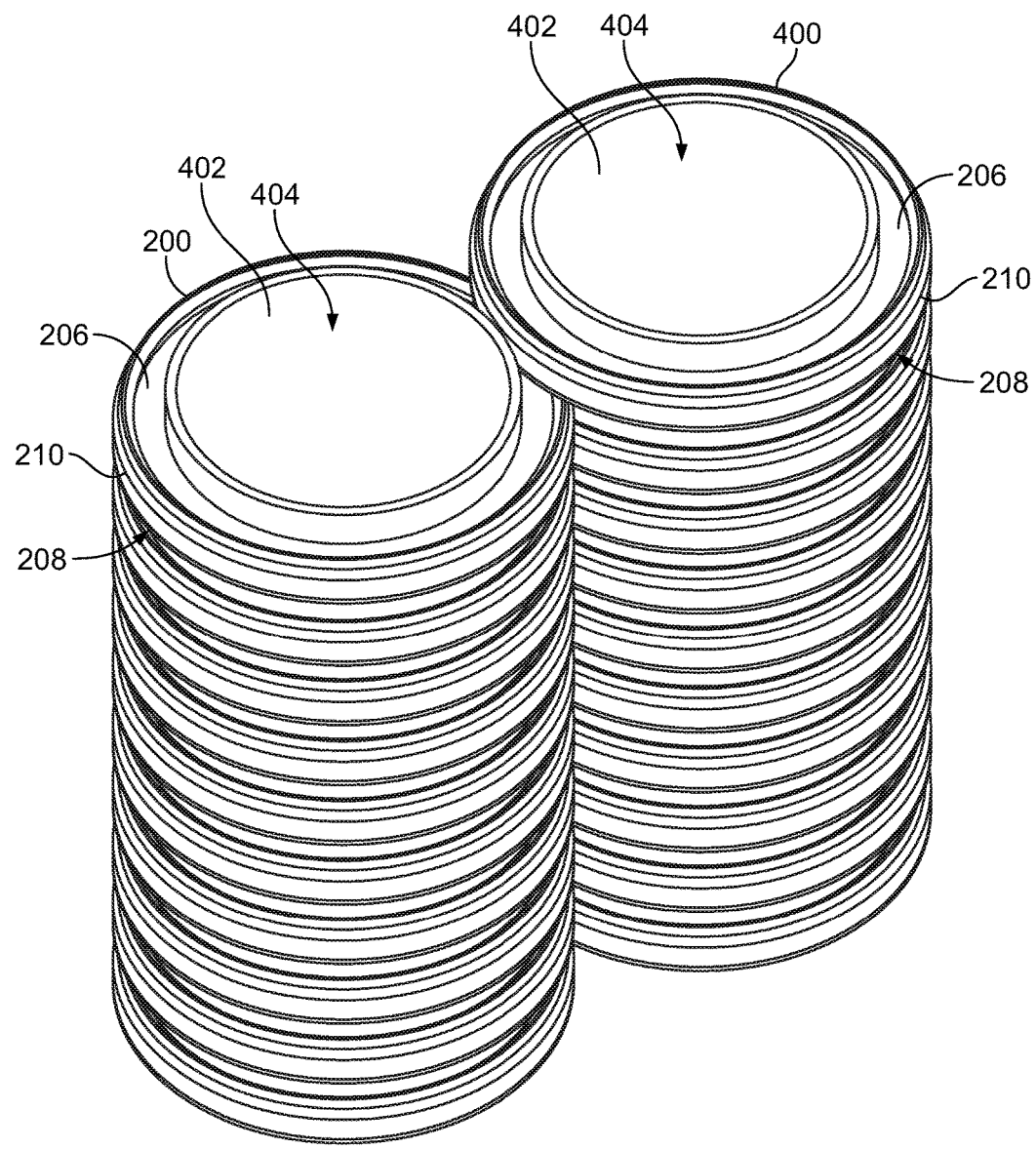
FIG. 4 illustrates the corrugated conduit of FIG. 2 interlocked with another example corrugated conduit.

FIG. 4 illustrates the conduit 200 (e.g., a first conduit) and another example conduit 400 (e.g., a second conduit) interlocked together. As illustrated in FIG. 4, the conduit 200 includes an inner surface 402 that defines a pathway 404 for wiring (e.g., the wiring 104 of FIG. 1).

The conduit 400 illustrated in FIG. 4 includes the outer surface 204, the ribs 206, the grooves 208, the flanges 210, and the inner surface 402 that are identical and/or otherwise substantially similar to the outer surface 204, the ribs 206, the grooves 208, the flanges 210, and the inner surface 402 of the conduit 200 of FIGS. 2-4. Because those components are disclosed above in detail with respect to FIGS. 2-4, some characteristics of those components will not be further disclosed below.

As illustrated in FIG. 4, the conduit 200 and the conduit 400 are configured to interlock together. When the conduit 200 and the conduit 400 are interlocked together, the ribs 206 of the conduit 200 are received by the grooves 208 of the conduit 400, the grooves 208 of the conduit 200 receive the ribs 206 of the conduit 400, and the flanges 210 of the conduit 200 extend into the grooves 208 and beyond the flanges 210 of the conduit 400. Similarly, the ribs 206 of the conduit 400 are received by the grooves 208 of the conduit 200, the grooves 208 of the conduit 400 receive the ribs 206 of the conduit 200, and the flanges 210 of the conduit 400 extend into the grooves 208 and beyond the flanges 210 of the conduit 200.

Further, the thickness 308 of each of the flanges 210 of the conduit 200 is less than the width 302 between each pair of the ribs 206 of the conduit 400 and greater than the width 304 between each pair of the flanges 210 of the conduit 400 to enable the flanges 210 of the conduit 200 to interlock with the flanges 210 of the conduit 400. Similarly, the thickness 308 of each of the flanges 210 of the conduit 400 is less than the width 302 between each pair of the ribs 206 of the conduit 200 and greater than the width 304 between each pair of the flanges 210 of the conduit 200 to enable the flanges 210 of the conduit 400 to interlock with the flanges 210 of the conduit 200. For example, the lip 310 and the lip 312 of the conduit 200 engage the lip 310 and the lip 312 of the conduit 400 to cause the conduit 200 and the conduit 400 to interlock together.

FIGS. 2-4 illustrate the conduit 200 and the conduit 400 that include the ribs 206, the grooves 208, and the flanges 210. In other examples, the ribs 206, the grooves 208, and the flanges 210 may be included in other corrugated structure(s) to enable those corrugated structures to interlock together and/or with a conduit (e.g., the conduit 200, the conduit 400, a conduit 500 of FIG. 5, a conduit 700 of FIG. 7). For example, the ribs 206, the grooves 208, and the flanges 210 are included in retainer(s), shield(s), other electrical harness(es), and/or other corrugated structure(s) to enable those structure(s) to interlock together and/or with a conduit.

Figure 5:
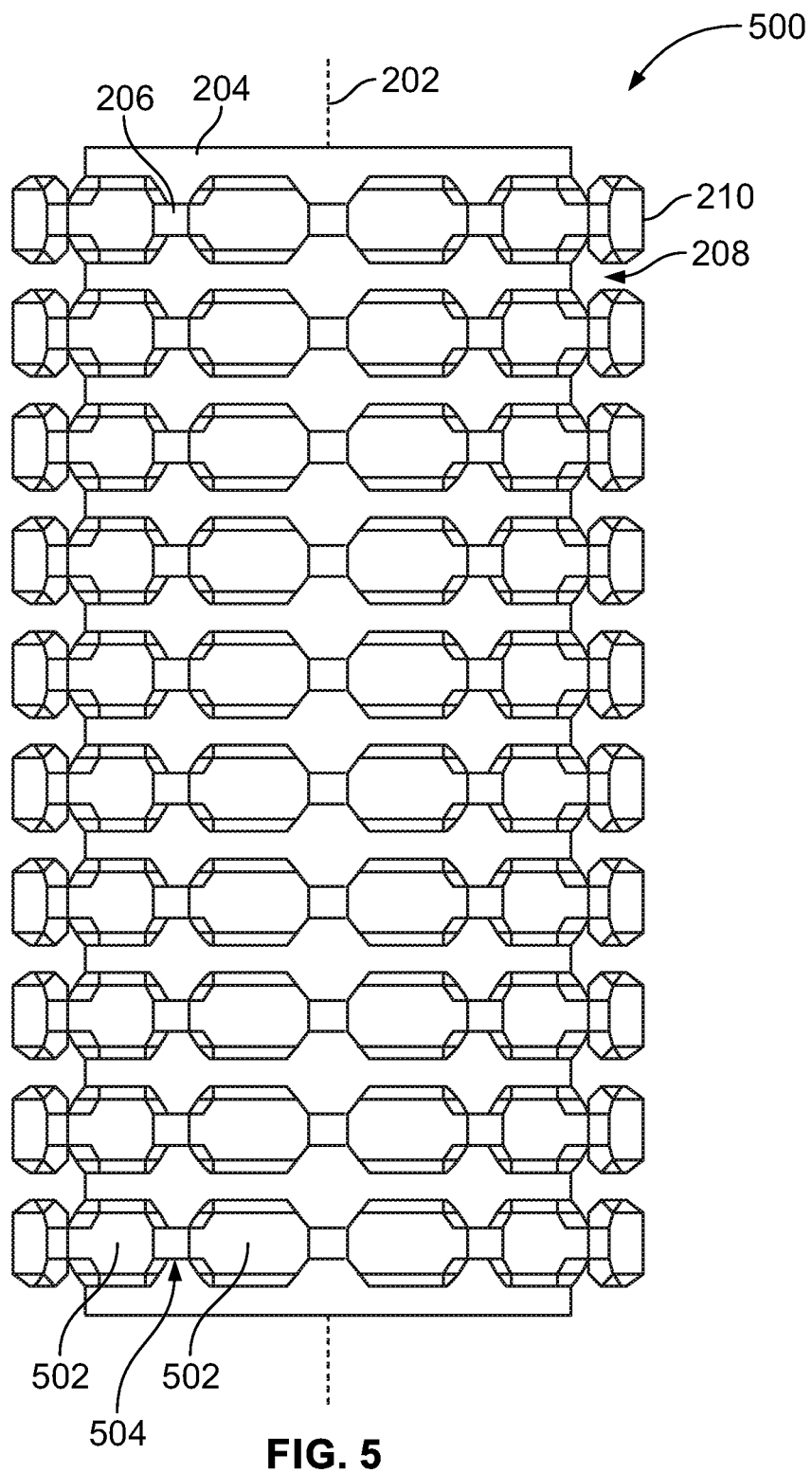
FIG. 5 depicts a side view of another example corrugated conduit in accordance with the teachings herein.
Figure 6:
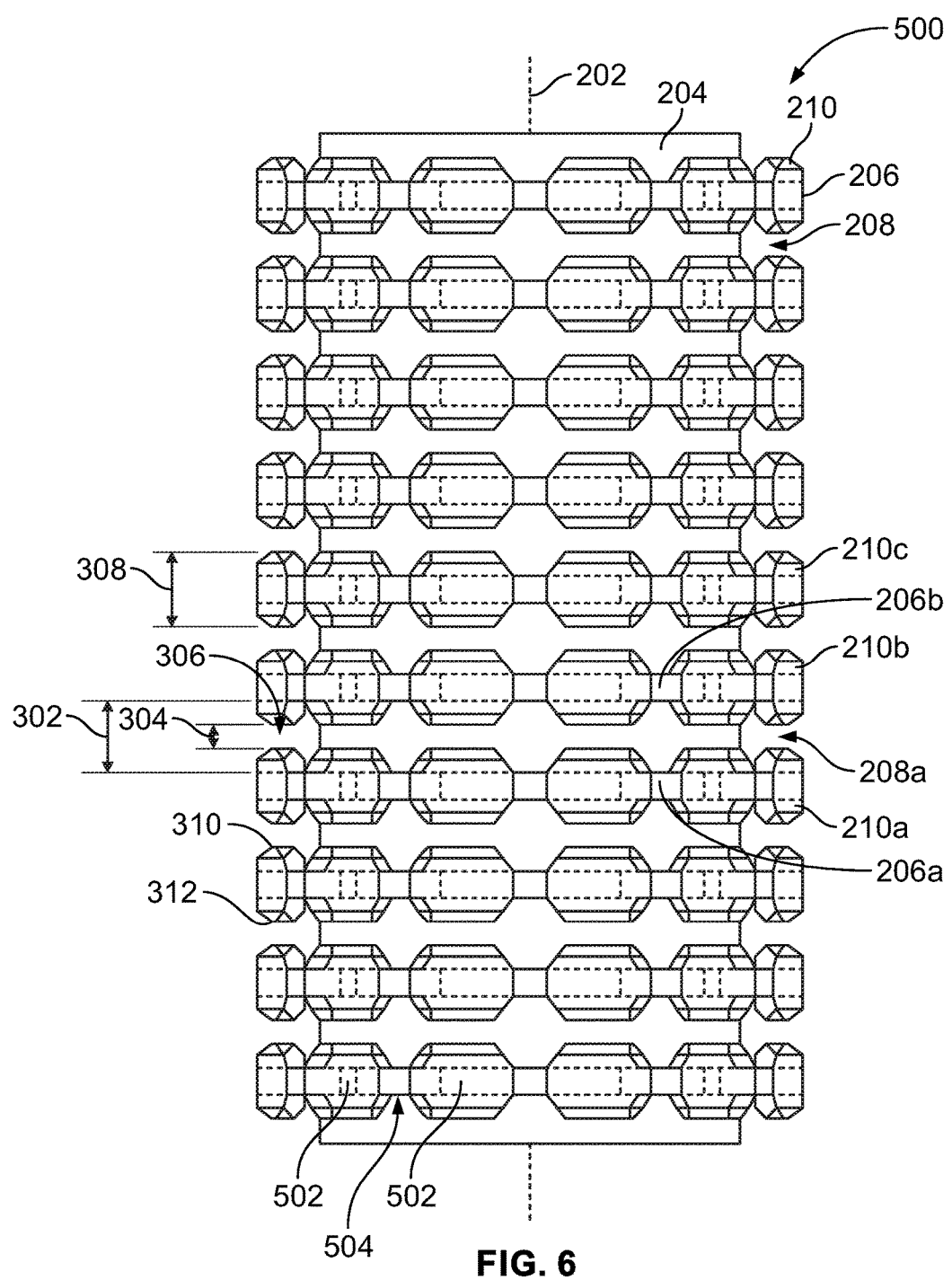
FIG. 6 depicts another side view of the corrugated conduit of FIG. 5.

FIGS. 5-6 depict another example conduit 500 in accordance with the teachings herein. More specifically, FIG. 5 illustrates a side view of the conduit 500, and FIG. 6 illustrates another side view of the conduit 500 that depict the ribs 206 via hidden lines.

The conduit 500 illustrated in FIGS. 5-6 includes the outer surface 204, the ribs 206, the grooves 208, the flanges 210, and the inner surface 402 that are identical and/or otherwise substantially similar to the outer surface 204, the ribs 206, the grooves 208, the flanges 210, and the inner surface 402 of the conduit 200 of FIGS. 2-4. Because those components are disclosed above in detail with respect to FIGS. 2-4, some characteristics of those components will not be further disclosed below.

As illustrated in FIGS. 5-6, one or more of the ribs 206 each include a plurality of teeth 502 that are spaced apart from each along a length of the corresponding one of the ribs 206. For example, a first of the ribs 206 includes a first set of the teeth 502, a second of the ribs 206 includes a second set of the teeth 502, a third of the ribs 206 includes a third set of the teeth 502, etc. In the illustrated example, a portion of one or more of the flanges 210 protrude from each of the plurality of teeth 502. For example, a first of the flanges 210 that correspond to the first of the ribs 206 protrude from each of the teeth 502 of the first of the ribs 206, a second of the flanges 210 that correspond to the second of the ribs 206 protrude from each of the teeth 502 of the second of the ribs 206, a third of the flanges 210 that correspond to the third of the ribs 206 protrude from each of the teeth 502 of the third of the ribs 206, etc.

The teeth 502 of the ribs 206 of the illustrated example are spaced apart from each other to increase the flexibility of the ribs 206. For example, the increased flexibility of the ribs 206 facilitates the ribs 206 of the conduit 500 in coupling to and/or decoupling from another conduit (e.g., the conduit 200 of FIGS. 2-4, the conduit 400 of FIG. 4, a conduit 700 of FIG. 7) and/or corrugated structure. Additionally or alternatively, the increased flexibility of the ribs 206 facilitates bending of the conduit 500 to form an arced and/or bent path of the conduit 500.

Further, as illustrated in FIGS. 5-6, the teeth 502 define notches 504 of the ribs 206. For example, the first set of teeth 502 defines a first set of the notches 504 of the first of the ribs 206, the second set of teeth 502 defines a second set of the notches 504 of the second of the ribs 206, the third set of teeth 502 defines a third set of the notches 504 of the third of the ribs 206, etc. The notches 504 facilitate the ribs 206 of the conduit 500 in interlocking with the other conduit and/or corrugated structure. For example, the notches 504 of the conduit 500 provide pathways for ribs of the other conduit and/or corrugated structure to facilitate the grooves 208 of the conduit 500 in receiving the ribs of the other conduit and/or corrugated structure. Additionally or alternatively, the pathways provided by the notches 504 of the conduit 500 facilitate the ribs 206 of the conduit 500 in extending into grooves of the other conduit and/or corrugated structure.

Figure 7:
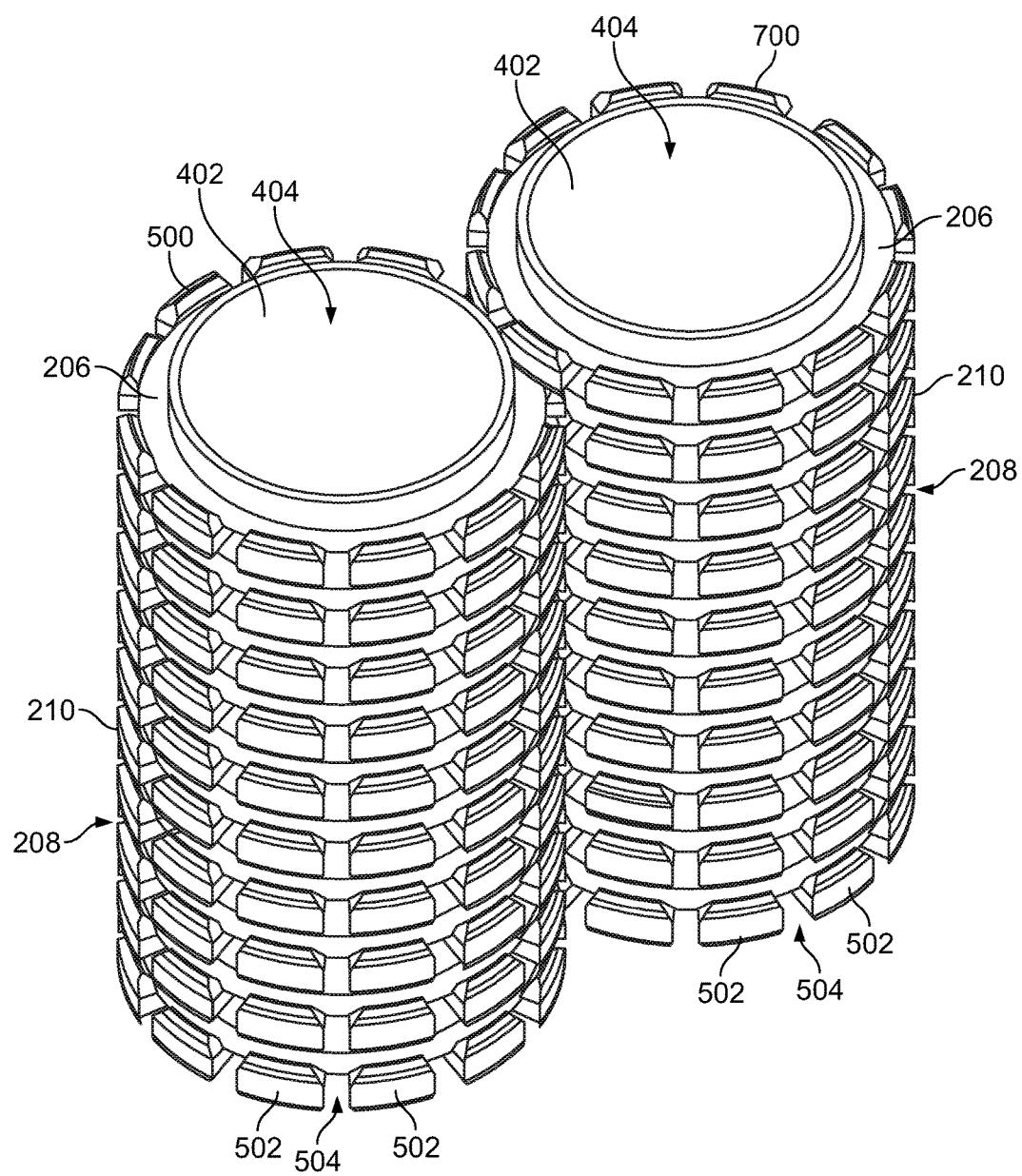
FIG. 7 illustrates the conduit of FIG. 5 interlocked with another example corrugated conduit.

FIG. 7 illustrates the conduit 500 (e.g., a first conduit) and another example conduit 700 (e.g., a second conduit) interlocked together. The conduit 700 illustrated in FIG. 7 includes the outer surface 204, the ribs 206, the grooves 208, the flanges 210, the inner surface 402, and the teeth 502 that are identical and/or otherwise substantially similar to the outer surface 204, the ribs 206, the grooves 208, the flanges 210, the inner surface 402, and the teeth of the conduit 500 of FIGS. 5-7. Because those components are disclosed above in detail with respect to FIGS. 2-6, some characteristics of those components will not be further disclosed below.

As illustrated in FIG. 7, the conduit 500 and the conduit 700 are configured to interlock together. When the conduit 500 and the conduit 700 are interlocked together, the ribs 206 of the conduit 500 are received by the grooves 208 of the conduit 700, the grooves 208 of the conduit 500 receive the ribs 206 of the conduit 700, and the flanges 210 of the conduit 500 extend into the grooves 208 and beyond the flanges 210 of the conduit 700. Similarly, the ribs 206 of the conduit 700 are received by the grooves 208 of the conduit 500, the grooves 208 of the conduit 700 receive the ribs 206 of the conduit 500, and the flanges 210 of the conduit 700 extend into the grooves 208 and beyond the flanges 210 of the conduit 500.

Further, the thickness 308 of each of the flanges 210 of the conduit 500 is less than the width 302 between each pair of the ribs 206 of the conduit 700 and greater than the width 304 between each pair of the flanges 210 of the conduit 700 to enable the flanges 210 of the conduit 500 to interlock with the flanges 210 of the conduit 700. Similarly, the thickness 308 of each of the flanges 210 of the conduit 700 is less than the width 302 between each pair of the ribs 206 of the conduit 500 and greater than the width 304 between each pair of the flanges 210 of the conduit 500 to enable the flanges 210 of the conduit 700 to interlock with the flanges 210 of the conduit 500. For example, the lip 310 and the lip 312 of the conduit 500 engage the lip 310 and the lip 312 of the conduit 700 to cause the conduit 500 and the conduit 700 to interlock together.

FIGS. 5-7 illustrate the conduit 200 and the conduit 400 that include the ribs 206, the grooves 208, the flanges 210, and the teeth 502. In other examples, the ribs 206, the grooves 208, the flanges 210, and the teeth 502 may be included in other corrugated structure(s) to enable those corrugated structures to interlock together and/or with a (e.g., conduit 200, the conduit 400, the conduit 500, the conduit 700). For example, the ribs 206, the grooves 208, the flanges 210, and the teeth 502 are included in retainer(s), shield(s), other electrical harness(es), and/or other corrugated structure(s) to enable those structure(s) to interlock together and/or with a conduit.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A wire conduit comprising:
   an inner surface defining a pathway;
   an outer surface;
   annular ribs extending from the outer surface and defining annular grooves, the annular ribs configured to be received by grooves of a corrugated structure, the annular grooves configured to receive ribs of the corrugated structure;
   flanges protruding from distal ends of the annular ribs and configured to interlock with opposing flanges of the corrugated structure for coupling to the corrugated structure.

2. The wire conduit of claim 1, wherein the annular ribs extend around a circumference of the outer surface.

3. The wire conduit of claim 2, wherein the flanges extend around the circumference of the outer surface.

4. The wire conduit of claim 1, wherein the flanges are formed of flexible material that facilitates the flanges in being inserted into the grooves of the corrugated structure.

5. The wire conduit of claim 1, wherein one or more of the flanges each include a first lip and a second lip opposite the first lip that extend in opposite directions perpendicular to the corresponding one or more of the annular ribs.

6. The wire conduit of claim 1, wherein one or more of the annular ribs each include a plurality of teeth that are spaced apart from each other along a length of the corresponding one of the annular ribs to increase flexibility of the corresponding one of the annular ribs to facilitate coupling to and decoupling from the corrugated structure.

7. The wire conduit of claim 6, wherein the plurality of teeth define notches of the corresponding one or more of the annular ribs to facilitate the annular grooves in receiving the ribs of the corrugated structure.

* * * * *